US008289845B1

(12) United States Patent
Baldonado et al.

(10) Patent No.: US 8,289,845 B1
(45) Date of Patent: Oct. 16, 2012

(54) ASSURED PATH OPTIMIZATION

(75) Inventors: Omar Baldonado, Palo Alto, CA (US);
Sean Finn, Palo Alto, CA (US);
Timothy F. Kaye, Lakewood, CO (US);
Jose-Miguel Pulido, Barcelona (ES);
Faisal Siddiqi, Santa Clara, CA (US);
Ryan J. Tetreault, New Durham, NH (US)

(73) Assignee: Avaya Inc., Basking Ridge, NJ (US)

( * ) Notice: Subject to any disclaimer, the term of this patent is extended or adjusted under 35 U.S.C. 154(b) by 484 days.

(21) Appl. No.: 11/862,666

(22) Filed: Sep. 27, 2007

Related U.S. Application Data

(60) Provisional application No. 60/938,156, filed on May 15, 2007, provisional application No. 60/954,529, filed on Aug. 7, 2007.

(51) Int. Cl.
*H04L 12/26* (2006.01)
*H04L 12/28* (2006.01)
*G06F 11/00* (2006.01)
*G06F 15/173* (2006.01)

(52) U.S. Cl. ........ 370/230; 370/229; 370/232; 370/237; 709/239

(58) Field of Classification Search .................. 370/230, 370/231, 230.1, 232, 237, 220, 218, 352; 709/238, 239, 240, 241, 242
See application file for complete search history.

(56) References Cited

U.S. PATENT DOCUMENTS

| | | | |
|---|---|---|---|
| 2002/0075813 A1 | 6/2002 | Baldonado et al. | |
| 2002/0078223 A1* | 6/2002 | Baldonado et al. | 709/232 |
| 2002/0129161 A1 | 9/2002 | Lloyd et al. | |
| 2002/0184393 A1 | 12/2002 | Leddy et al. | |
| 2003/0039212 A1 | 2/2003 | Lloyd et al. | |
| 2003/0161321 A1* | 8/2003 | Karam et al. | 370/395.21 |
| 2004/0205098 A1 | 10/2004 | Lloyd et al. | |
| 2006/0072543 A1 | 4/2006 | Lloyd et al. | |
| 2006/0092841 A1 | 5/2006 | Lloyd et al. | |
| 2007/0064715 A1 | 3/2007 | Lloyd et al. | |
| 2007/0115840 A1 | 5/2007 | Feick et al. | |

OTHER PUBLICATIONS

Akella, A.; et al., "A Comparison of Overlay Routing and Multihoming Route Control," SIGCOMM, 2004.
Akella, A.; et al., "A Measurement-Based Analysis of Multihoming," SIGCOMM, 2003.
Goldenberg, D; et al., "Optimizing Cost and Performance for Multihoming," SIGCOMM, 2004.
Lavobits, C.; et al. "Delayed Internet Routing Convergence." In Proc. ACM SIGCOMM, 2000; pp. 175-187.
Lloyd, M., "On the Performance Characteristics of BGP Routing Decisions," ISMA, 2001.
Markopoulou, A.; et al., "Assessing the Quality of Voice Communications over Internet Backbones," IEEE/ACM Transactions on Networking, 2003, vol. 11; pp. 747-760.
Nakao, A.; et al., "A Routing Underlay for Overlay Networks," SIGCOMM, 2003.
Qui, L.; et al., "On Selfish Routing in Internet-Like Environments, "SIGCOMM, 2003.

(Continued)

*Primary Examiner* — Kwang B Yao
*Assistant Examiner* — Adam Duda
(74) *Attorney, Agent, or Firm* — Sheridan Ross P.C.

(57) ABSTRACT

The present invention is directed to simultaneously monitoring the performance of differing communication paths between selected sites for detecting performance problems over one of the monitored paths, and moving packet traffic to one or more other better performing paths.

26 Claims, 9 Drawing Sheets

OTHER PUBLICATIONS

Uhlig, S.; et al., "Designing BGP-based Outbound Traffic Engineering Techniques for Stub ASes," ACM SIGCOMM CCR, 2004, vol. 34, No. 5.

Background of the Invention for the above-captioned application (previously provided).

* cited by examiner

| spv | spf | spType | Total SubPkt Length | } SubPacket Header |
|---|---|---|---|---|

| Data Type | Test Type | No Padding |
|---|---|---|

| Src IP Address |
|---|

| Dst IP Address |
|---|

| Src Zon Ln | Src Zone Name String |
|---|---|
| Dst Zon Ln | Dst Zone Name String |

| Edge IP Address 1 |
|---|

| Edge IP Address 2 |
|---|

| cstate | tstate | cstrike | tsrstrike |
|---|---|---|---|

| Tolerance Lower Limit |
|---|
| Tolerance Upper Limit |
| Control Lower Limit |
| Control Upper Limit |
| Test Type Payload (Meas. Results) |

| Round Trip Time |
| --- |
| Packet Loss |
| Interarrival Time |
| Number Packets |
| Packet Delta |
| Payload Length |
| Timeout |
| TOS |

Fig. 4

| CError |
| --- |
| Delay |
| Interarrival Time |
| Timeout |
| Port |

Fig. 5

| Delay |
| --- |
| Loss |
| Jitter |
| Interarrival Time |
| Num Packets |
| Packet Delta |
| Payload Len |
| Linger Time |
| TOS |

| Country Code | NDD | Area Code | Average Round Trip Time | Measurement Rate | Timeout | Loss Count |
|---|---|---|---|---|---|---|
| 1 | 1 | 201 | 150 Msec | 5/Sec | 200 Msec | 3 |
| 1 | 1 | 301 | 150 Msec | 5/Sec | 200 Msec | 3 |
| 1 | 1 | 408 | 150 Msec | 5/Sec | 200 Msec | 3 |
| 1 | 1 | 805 | 150 Msec | 5/Sec | 200 Msec | 3 |
| ⋮ | ⋮ | ⋮ | ⋮ | ⋮ | ⋮ | ⋮ |
| 14 | 0 | 20 | 300 Msec | 3/Sec | 150 Msec | 2 |
| ⋮ | ⋮ | ⋮ | ⋮ | ⋮ | ⋮ | ⋮ |
| 61 | 1 | 2 | 350 Msec | 3/Sec | 150 Msec | 2 |
| ⋮ | ⋮ | ⋮ | ⋮ | ⋮ | ⋮ | ⋮ |

*Fig. 9*

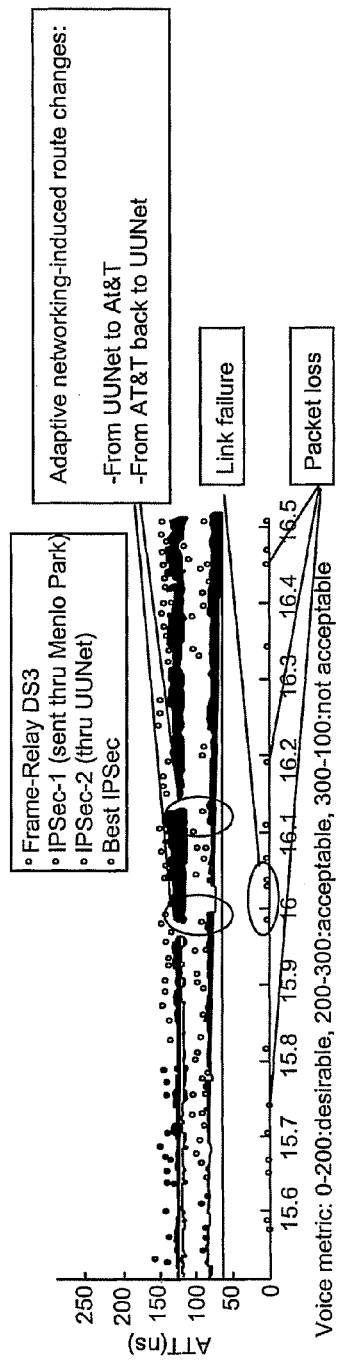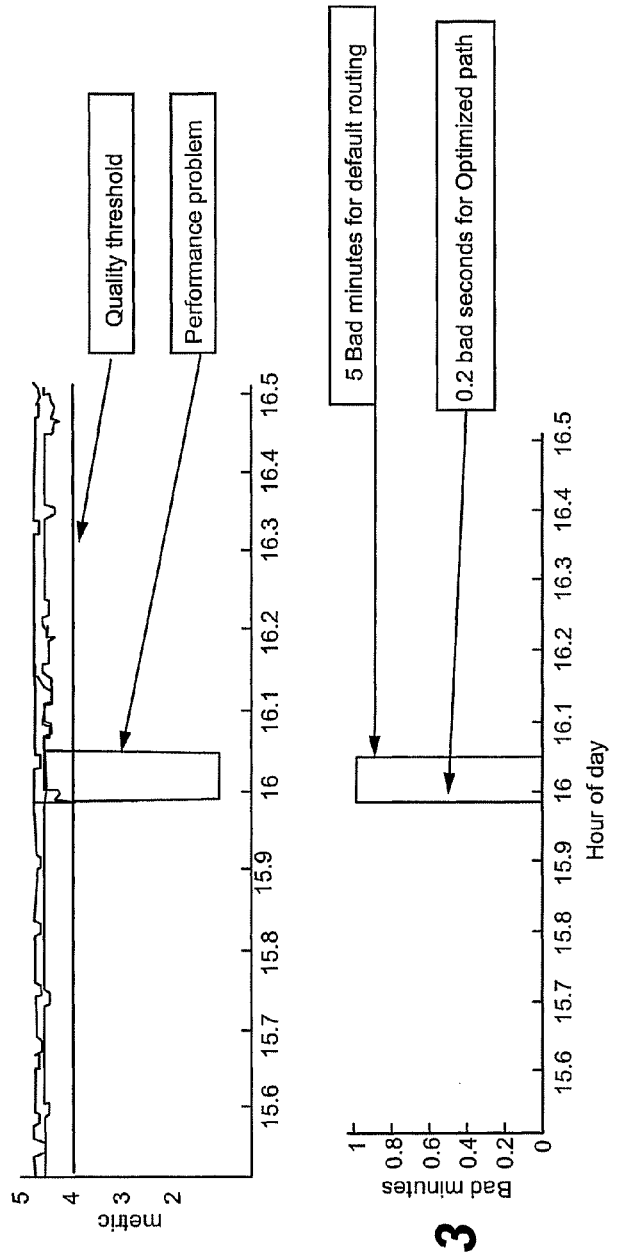
Fig. 11
Fig. 12
Fig. 13

ASSURED PATH OPTIMIZATION

CROSS REFERENCE TO RELATED APPLICATION

The present application claims the benefits of U.S. Provisional Application Nos. 60/938,156, filed May 15, 2007, and 60/954,529, filed Aug. 7, 2007, both entitled "Assured Path Optimization", which is incorporated herein by this reference in its entirety.

FIELD OF THE INVENTION

The invention relates generally to communication path selection and particularly to selection of packet-switched communication paths.

BACKGROUND OF THE INVENTION

The Border Gateway Protocol (BGP) is the protocol that makes connectivity possible between the autonomous networks that collectively form the Internet. Each autonomous network, denoted an Autonomous System (AS), is itself a collection of physical networks under the same administrative entity. Each AS is identified by a unique Autonomous System Number (ASN). To achieve connectivity among them, AS's exchange routing information using BGP.

A BGP route contains reachability information about a section of the IP space, called a prefix. An AS that originates a prefix communicates the route to this prefix to its neighboring AS's. As the route travels from one AS to the next, each AS appends its ASN to the path. This set of ASNs is called an AS path.

Neighboring AS's exchange a vector of AS paths. Each AS then selects the AS path with the shortest length to any given AS from all the vectors received. Loop-free connectivity is achieved by having BGP devices discard routes that include the ASN of their own AS in the AS path.

BGPs decision-making process also includes a set of rules used to articulate policies that can override the selection of the path with the shortest length. The set of rules also include a number of tie-breaking rules to be used in case no one winning route has been selected using either policy or shortest AS path rules.

Transit providers are ASs that provide transit services to other ASs. They typically have default-free connectivity; that is, they are capable of reaching any prefix in the Internet. Internet Service Providers (ISPs) are usually transit providers whereas enterprises own edge networks and obtain their connectivity service from ISPs. Examples of ISPs include AT&T, Sprint, Earthlink, Level3, UUNET, and Qwest, to name a few.

An ISP is responsible for delivering traffic to and from its customers from any source and to any destination on the Internet. It is possible that an ISP does not have a direct connection to such a destination, in which case it hands the traffic to another ISP. Given that carrying traffic incurs costs, ISPs use BGP's policy rules to implement complex peering agreements among them to share these costs.

Enterprises also use BGP configuration to influence how traffic arrives and leaves their edge networks. One common technique used by multi-homed enterprises is the AS path prepending, where an edge network inserts its own ASN in the AS path of a route, thereby generating routes with different AS path lengths and affecting the distribution of inbound traffic access across its access links. Conversely, such enterprises can also apply filters to routes to particular destinations that they receive from their providers, thereby affecting the distribution of outbound traffic across these same access links.

BGP was designed to provide connectivity but does not take actual performance into account, resulting in it being essentially unaware of the many phenomena that result in performance degradation. ISPs lose control over the performance of a given flow as soon as they hand the flow to another ISP. Therefore, given that no ISP is directly connected to all possible destinations, no ISP can offer Internet-wide end-to-end guarantees to its customers. For inter-ISP routing, the use of BGPs is based on policy rules, and those rules are often motivated by economic considerations. As a result, an ISP's contractual agreement with its customers is typically limited to maintaining good performance within their network. In the end, enterprise customers cannot obtain guarantees on what they care the most about, namely end-to-end performance for their mission-critical applications.

Performance degradation can have a significant detrimental impact on business productivity, particularly as organizations rely more on the Internet for business communications. Examples of important business communications include Voice over IP (VoIP), video over IP, and session establishment via the Session Initiation Protocol (SIP). VoIP users are not willing to tolerate performance degradation in bearer traffic, such as a few seconds of "dead air" in a live conversation. In contact centers, a warm restart of an IPSI board occurs when there is no successful heartbeat communication between the controlling application and board for longer than 3 seconds, i.e., if performance degradation affects the signaling traffic. Contact center agents are forced to reconnect after a warm restart, losing their existing sessions with customers.

While some BGP configuration techniques can be and are being used, in theory, to improve performance, in their communications with destinations many ASs away, enterprises are still left with no end-to-end performance guarantees and can experience transient performance degradation, particularly in MultiProtocol Label Switching (MPLS)-Virtual Private Networks (VPNs) (which are becoming the de-facto standard for enterprise communications). Such degradation is primarily due to delays incurred by BGP after the routing information towards a destination changes, and a new routing path needs to be chosen. BGP and other routing protocols are not directly connected to the network fabric and unable to detect rapidly connectivity failures. Performance degradation can be significant enough that it renders the application on the network unusable even though connectivity is maintained. This phenomenon, where connectivity is available but the application can not function, is typically referred to as a "brownout". Brownouts are a significant problem for applications that BGP cannot address given that BGP only reacts to total loss of connectivity.

Network operators can use BGP filtering mechanisms to statically route traffic through the best performing path, assuming that the performance of that path is known. Edge networks have little control over the path that their traffic takes across the Internet. It is only possible for them to select how to exit the edge network (i.e., the first hop), and this selection is determined typically by complicated policy rules in BGP. In practice, however, these techniques are seldom used given that they need to be implemented manually, require significant operational expertise, and require constant maintenance given that performance changes are common.

Finally, BGPs reaction times can typically be slow, even in the event of connectivity loss. When a previously reachable destination becomes unreachable, a phenomenon known as a blackout, BGP detects the problem and selects an alternative route to that destination. However, studies show that BGP can, in many cases, take a significant amount of time to converge to a new route, with unpredictable performance consequences during the convergence period.

Path optimization technology exploits path diversity in a communications network by detecting performance and/or connectivity problems and rerouting around them in real time. However, current path optimization technology is not usually configured with the measurement rates and timeout-related parameters necessary to detect confidently these events in the time scale necessary to prevent active users from perceiving the degradation. In addition, current path optimization technology cannot control the return path of the measurements that follow the path selected by default routing protocols such as BGP, which may lead to the inability to react in time to certain network problems, such a bidirectional line cut.

SUMMARY OF THE INVENTION

These and other needs are addressed by the various embodiments and configurations of the present invention. The present invention is generally directed to architectures and methods for monitoring the performance of differing communication paths between selected sets of nodes and, in response to detecting performance problems over one of the monitored paths, moving packet traffic to one or more other higher quality paths.

In a first embodiment, a method is provided that includes the steps:

(a) selecting a measurement rate, a timeout parameter, and a test packet loss threshold to realize a predetermined maximum response time, the measurement rate being a frequency of transmission of test packets, the timeout being a time period, the passage of which is required to determine that a test packet has been lost, and the test packet loss threshold being a number of consecutive test packets lost over a selected communication path to determine that connectivity over the communication path is disconnected;

(b) generating and sending at the selected measurement rate test packets over first and second communication paths, the first communication path being used for data signals associated with a communication session between first and second users and the test packets not being associated with the communication session;

(c) determining from the sent test packets a set of performance metrics for each of the first and second communication paths; and (d) when the number of consecutive packet losses over the first communication path is at least the packet loss threshold, determining that connectivity over the first communication path is degraded and moving one or more data and/or control channels of the session to the second communication path.

The session is commonly a live voice communication session, with the data signals comprising voice information. Each of the first and second communication paths are commonly defined by source and destination identifiers and source and destination prefixes. Inter-path traffic diversions are normally performed by sending an update to an edge router.

The test packets are not associated with the session in that they do not carry a data payload or control signals for the session. In other words, the test packets do not carry real time voice information or control signals for a VoIP session.

The set of performance metrics typically includes one or more of test packet loss, test packet round trip time, test packet interarrival time, test packet delta, test packet jitter, and hop round trip time.

The method can address shortcomings of existing path optimization technology. Existing technology exploits diversity in a communications network by detecting performance and/or connectivity problems and rerouting them in real time. However, unlike this embodiment of the present invention, current path optimization technology is not usually configured with the measurement rates and timeout-related parameters necessary to detect confidently those events in the time scale necessary to prevent active users from perceiving the degradation. The timescale can be readily varied to account for the differing performance requirements demanded by a set of applications and/or a type of service.

To provide added benefits, the present invention can, unlike current path optimization technology, control the return path of measurements, thereby providing the ability to react in time to certain network problems. To perform bidirectional path optimization, the invention deploys a path optimization device both at the local and remote sites, thereby ensuring that both sites have path optimization capabilities and allowing the detection and repair of unidirectional failures from the remote site to the local site and vice versa. In the absence of bidirectional path optimization, when a unidirectional failure occurs on the default path between the sites, the degradation of the Performance on the path could not be detected as the test packets could not return to the path optimization device.

Yet more benefits can be provided by ensuring that performance is measured symmetrically, with measurements coming and going over the same path. This ensures that measurements sent over a path through a provider always return via that provider and that the measurements mirror the actual data and/or control signaling traffic. In this way, when there is a bidirectional line cut in one provider and not the other(s), measurements over the provider(s) that do not have the cut should always succeed. Otherwise, bidirectional line failures could still go undetected if both the local and the remote sites were choosing by default the path where the bidirectional failure happens.

In one configuration, when a performance score on the first communication path, based on the set of performance metrics, is unacceptable, one or more of the data and/or control signals of the session is moved to the second communication path. Commonly, this configuration is implemented by:

(i) determining, for each of the first and second communication paths, a respective performance score based on a corresponding set of performance metrics;

(ii) comparing each of the first and second performance scores for the first and second communication paths against a threshold performance score; and (iii) when the comparison step indicates that the first communication path has an unacceptable performance while the second communication path has an acceptable performance, applying a set of rules to determine whether or not to move a data and/pr control signal from the first to the second communication path. The rules consider one or more of the following factors: link load balancing considerations, transit network provider network load balancing considerations, billing functions and/or cost, degree of tolerance to performance degradation for the selected set of applications, parth reliability and path preference.

In one configuration, different types of performance scores are determined for each of the first and second communication paths. The differing types of performance scores are associated with different sets of communication applications.

For the communication session and for each of the first and second communication paths, an appropriate type of performance scores is selected. For example, the first and second performance scores are a type of performance score corresponding to a member of the set of communication applications involved in the communication session.

In one configuration, the type of test packet is varied based on one or more of a type of service and set of applications to use each of the first and second communication paths.

In one configuration, the measurement rate, timeout parameter, and/or packet loss threshold are varied based on one or more of (i) the relative geographical locations of the nodes at either end of a selected communication path and (ii) a normal packet round trip time between over the selected communication path.

The present invention can provide a number of advantages depending on the particular configuration. By way of example, the invention can avoid performance degradation by exploiting path diversity to redirect application traffic from the local site to the remote site in real time via the better performing path. Effective layer-3 path diversity is available via multiple routes to the destination prefix. The invention can be implemented such that performance routes do not propagate outside the edge network to transit providers and therefore do not alter interdomain routing. In addition, an individual decision about a prefix can shift only the amount of load associated with the prefix. Hence, load shifts between transit providers occur incrementally, effectively avoiding sudden load shifts from one provider to another.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "communication path" as used herein refers to a physically and/or logically defined unidirectional or bidirectional signal channel. Instantiations of communication path include one or more consecutive links, a subnet pairing, an endpoint pairing, a VPN tunnel, and the like. Different communication paths can be physically and/or logically distinct in whole or part; that is, the fact that communication paths overlap does not make them the same. Commonly, communication path diversity is determined based on OSI Layer 3 routing topology but can be determined based on other OSI layers.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common fowls of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term performance score as used herein refers to a measure, level, or grade of communication or service quality between selected nodes. A performance score is used commonly in reference to the quality of voice communications but is intended to include applications or services other than voice communications, including data communications and multimedia communications.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

FIG. 2 is a first packet structure according to an embodiment of the present invention;

FIG. 3 is a first packet structure according to an embodiment of the present invention;

FIG. 4 is a first packet structure according to an embodiment of the present invention;

FIG. 5 is a first packet structure according to an embodiment of the present invention;

FIG. 9 is a flow chart according to an embodiment of the present invention;

FIG. 11 is a plot of packet RTT (milliseconds) (vertical axis) against time (hour of day) (horizontal axis);

FIG. 12 is a plot of MOS rating (vertical axis) against time (hour of day) (horizontal axis);

FIG. 13 is a plot of VoIP performance (vertical axis) against time (hour of day) (horizontal axis)

DETAILED DESCRIPTION

The Architecture

Figure 1:
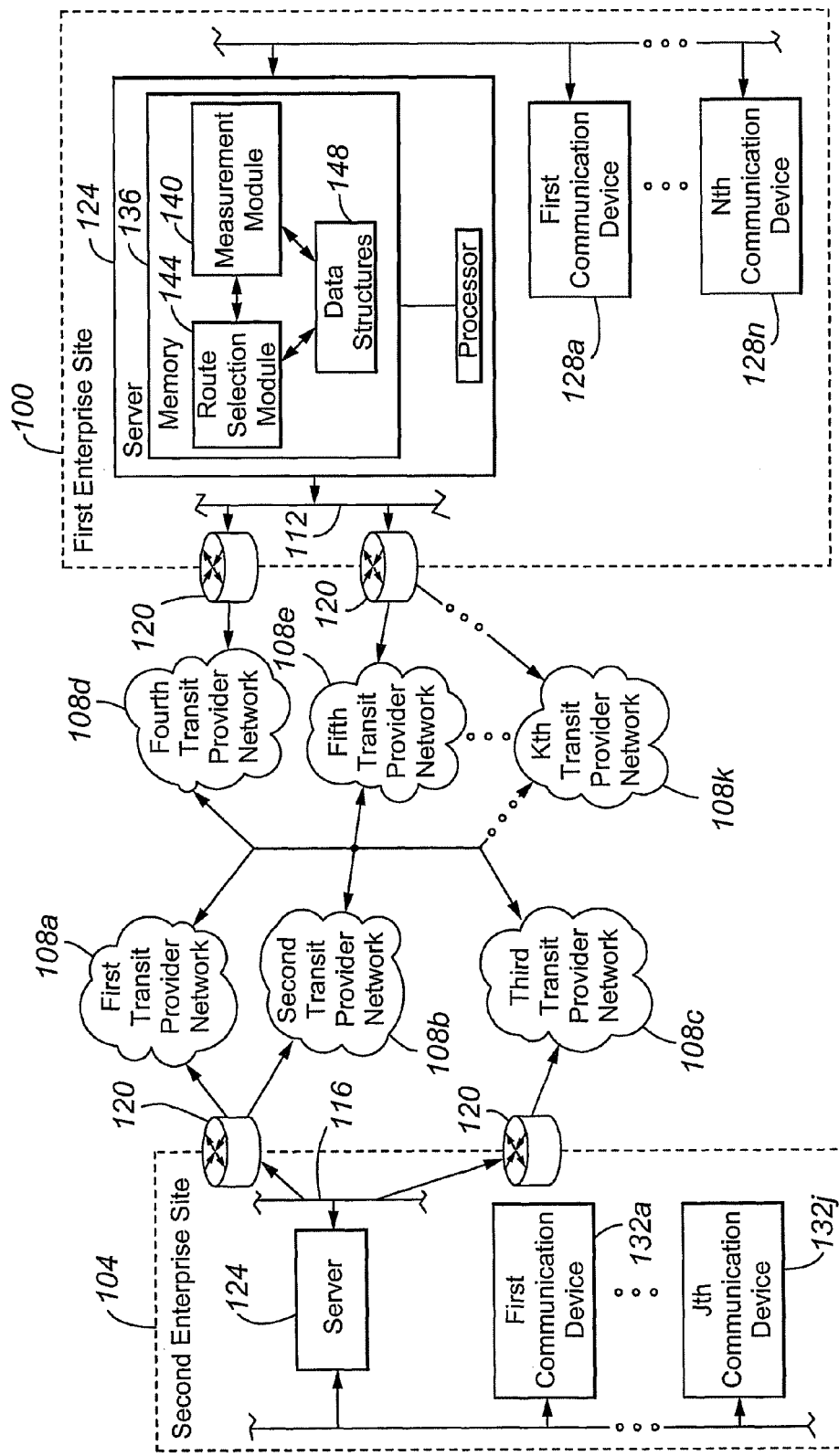
FIG. 1 is a block diagram of an architecture according to an embodiment of the present invention.

FIG. 1 depicts a networking architecture according to an embodiment of the present invention. First and second enterprise sites 100 and 104 are interconnected by a plurality of first, second, third, fourth, fifth, . . . kth transit provider networks 108a-k. Each transit provider network corresponds to a separate Autonomous System (AS), each being identified by a unique Autonomous System Number (ASN), which is an example of a type of prefix. In addition, each enterprise site 100 and 104 includes an additional AS in the form of edge networks 112 and 116. Each edge network 112 and 116 includes a plurality of edge routers 120. The use of the same reference number to refer to an entity means that the entities are physically and/or functionally the same.

The premise, of which the first and second enterprise sites 100 and 104 are parts, typically corresponds to a content provider network. The first and second sites 100 and 104 are each multihomed to a plurality of transit provider networks, namely the fourth, fifth, . . . kth transit provider networks 108d, e, . . . k for the first site 100, and the first, second, . . . third transit provider networks 108a, b, . . . c for the second site 104. The edge routers 120 in the edge networks 112 and 116 peer with the respective multihomed transit provider networks and use BGP to receive via these peering routes to all relevant destinations. In the architecture of FIG. 1, for example, the content provider has potentially a-k possible paths to a given destination. As will be appreciated, the premise is not limited to content provider networks nor is each enterprise site required to be multihomed to multiple transit providers. The premise communicates with end users located in some edge network many AS hops away.

Each enterprise site 100 and 104 includes a plurality of communication devices (namely first . . . nth communication devices 128a-n for the first enterprise site 100 and first . . . jth communication devices 132a-j for the second enterprise site 104) and a server 124. The communication devices can be any electronic communication device, including without limitation VoIP hard or softphones, Personal Digital Assistants (PDAs), wireless or cellular phones, personal computers, laptops, and the like.

The memory 136 of each server 124 includes a number of computational modules, namely measurement module 140 and route selection module 144, and associated data structures 148. Each of the servers is software-controlled and can include other computational modules (not shown) for performing a variety of tasks, depending on the server's role in the enterprise network. For example, the servers can host the content that end users are interested in accessing and/or provide call admission and control functionality. The measurement module 140 takes, in real time, end-to-end measurements across a selected set of communication paths to a selected destination and analyzes preliminarily the test results to provide corresponding set of performance statistics for each member of the selected path set. The route selection module 144 combines the performance metrics for each path (e.g., each subnet or prefix pair encompassing the measured target(s)) in the selected path set, determines an Application Performance Rating (APR) and combines the APR with the enterprise's preferences and policies to select the best or optimal path for a selected session to use and implements the decision via BGP.

To perform bidirectional path selection or optimization, autonomous computational modules 140 and 144 are deployed at the local and remote site defining the communication path being monitored. As discussed below, this ensures that the egress path in each site is measured "symmetrically", with measurements coming and going over the same path. In other words, the use of two servers 124, one being positioned at each end of a communication path, ensures that test packets are forwarded reliably over a specified path. Each server 124 independently manages the egress decisions from its own site, e.g., via BGP. Notwithstanding independent management, route selection decisions of the servers at either end of a set of communication paths are commonly complimentary.

The Measurement Module

The measurement module 140 generates test packets and sends the packets to a selected destination for a selected path (which is a unique pairing of a source and destination identifiers and/or prefixes). The measurements obtained are raw network data, such as one-way or two-way delay, jitter or delay variation, packet loss, and, in some cases, network topology. Measurement endpoints, and/or paths, can be either statically configured on the server 124 or dynamically discovered by inspecting traffic, using techniques such as layer-2 switch span ports or receiving information about network flows from routers.

In one configuration, measurements are on an inter-zone basis. A zone is a hierarchical collection of sub-zones and test subcomponents. The zone hierarchy commonly reflects a geographical organization. The zones are typically arbitrarily selected, bearing no relation to the network topology. An AS can include one or more zones, and a zone one or more sub-zones. Testing is commonly performed at a set rate between sub-zones of a zone.

The measurement module 140 can employ a number of active measurements, including Transport Control Protocol (TCP) Open-close, Real Time Protocol (RTP), Internet Control Message Protocol (ICMP) ping, or Traceprobe. The particular measurement methodology selected for a test packet depends on the set of communication applications and/or protocols to be deployed on the selected path and the desired types of measurements.

Traceprobe is a measurement methodology that can be employed. It can be used to measure Round-Trip Time (RTT) to a target (such as another measurement module), which is not responding to "ping" probes. The Traceprobe algorithm can determine a proxy host for the unresponsive target by sending Time To Live (TTL)-limited User Datagram Protocol (UDP) packets toward the target, using the classic trace route trick. This trick requires high-port UDP datagrams to be sent towards the target but setting the time to live field with increasing values starting from a low value. Parallel trace routes are sent over selected available links (e.g., service-provider access links) toward the target to collect hops in the path leading up to the target. From amongst the hops, a hop close to the target is selected that is reachable via all (or most) of the links. Once a proxy host is determined, the measurement module 140 directly "pings" the proxy host in lieu of the unresponsive target.

When the route selection module 144 and/or data repository for data structures 148 are not collocated with the measurement module 140, the measurements are provided to the route selection module 144 and/or data repository in the form of signals having the structures shown in FIGS. 2-6.

FIG. 2 shows one possible embodiment of the packetized payload, where "spv" refers to SubPacket Version; "SPF" to SubPacket Flags; "spType" to SubPacket Type; "Total Sub-Pkt Length" to the length in bytes including the subpacket header; "DataType" to the data type (e.g., EndtoEnd or Edge (where edge refers to a segment of a test path made up of two consecutive IP addresses)); "TestType" to the type of measurement method (e.g., TCP Open-close, ICMP ping, RTP, and Trace route); "Src IP Address" to the network address of the test-initiating subcomponent of the source module; "Dst IP Address" to the network address test target subcomponent of the destination module; "SrcZonLen" to the length in bytes of the name of the subzone that directly owns the test-initiating subcomponent of the source module; "SrcZoneName string" to the bytes of the name of the subzone that directly owns the test-initiating subcomponent of the source module; "DstZonLn" to the length in bytes of the name of the subzone that directly owns the target subcomponent of the destination module; "DstZonName string" to the bytes of the name of the subzone that directly owns the target subcomponent of the destination module; "EdgeIPAddress1" to the IP address, address of an interface of an edge (or link) between two network addresses at the source; "EdgeIPAddress2" to the IP address of an edge at the destination; "estate" to the control state for the test (e.g., On, Off, None); "tstate" to the tolerance state for the test (e.g., On, Off, None); "cstrike" to the number of control strikes for the test; "tstrike" to the number of tolerance strikes for the test; "Tolerance Lower Limit" to the configured lower limit for the test on a tolerance scale; "Tolerance Upper Limit" to the configured upper limit for the test on the tolerance scale; "Control Lower Limit" to the configured lower limit for the test on a control scale; "Control Upper Limit" to the configured upper limit for the text on the control scale; and "TestTypePayload" includes the measurement results which vary based on the test type as described below.

FIGS. 3-6 depict the test type payload structures.

FIG. 3 refers to a ping test type. The payload includes Round Trip Time (RTT); test packet loss; interarrival time between test results from test initiating subcomponent; number of test packets; test packet delta, payload length, timeout, and Type of Service (e.g., type of application) or TOS.

FIG. 4 refers to a TCP test type. The payload includes Condition Error or CError, test packet delay, test packet interarrival time, timeout, and port identifier.

FIG. 5 refers to an RTP test type. The payload includes test packet delay, test packet loss, test packet jitter, test packet interarrival time, number of test packets, test packet delta, payload length, linger time, and TOS.

Figure 6:
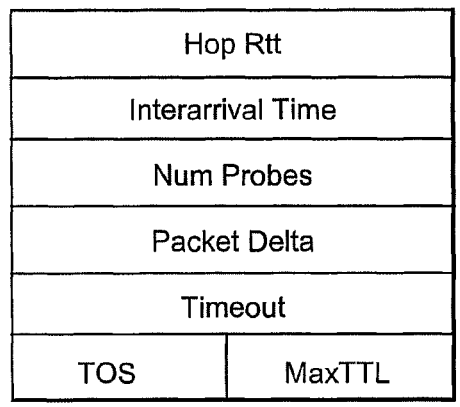
FIG. 6 is a first packet structure according to an embodiment of the present invention.

FIG. 6 refers to a trace route test type. The payload includes Hop Round trip time or HopRtt (this is the maximum round trip time from a first selected node to a second selected node), test packet interarrival time, number of probes (or test packets), test packet delta, timeout, TOS, and maximum time to live or MaxTTL.

Figure 7:
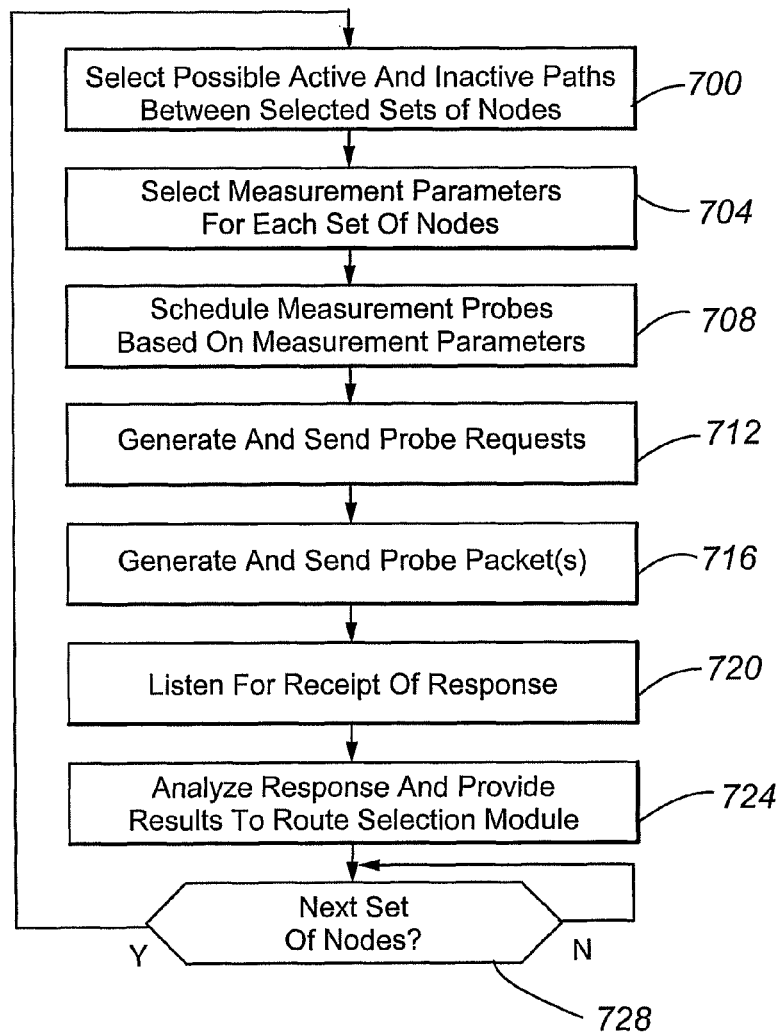
FIG. 7 is a flow chart according to an embodiment of the present invention.

The operation of the measurement module 140 will now be discussed with reference to FIG. 7.

In step 700, the module 140 selects a determined number of possible communication paths (which may be active or inactive) extending between selected first and second sets of nodes. Each path is typically identified by a pairing of source and destination network identifiers (which are typically edge network addresses of module 140 subcomponents on each end of the communication path) and/or a source and destination prefix. By way of example, a first communication path between the first and second enterprise sites 100 and 104 can be identified by an address 1.1.1.11 of a first subcomponent and a first prefix associated with the first enterprise site 100 and/or edge network 112 and an address 2.2.2.11 of a second subcomponent and a second prefix associated with the second enterprise site 104 and/or edge network 116, and a second communication path between the first and second enterprise sites can be identified by an address 1.1.1.12 of a third subcomponent and the first prefix and an address 2.2.2.12 of a fourth subcomponent and the second prefix. In one configuration, each path is defined by a pairing of communication path set identifier (which uniquely identifies the path set of which the path is a member) and path identifier (which uniquely identifies the path within the corresponding path set). Paths are typically persistent. For this reason, step 700 may be performed immediately prior to or well in advance of a session being established.

In step 704, the module 140 selects the measurement parameters for each pairing of node sets. This selection typically includes selection of the test methodology and/or performance metrics to be collected. The test methodology and/or performance metrics to be collected are typically based on a communications application and/or protocol to be employed on the communication path. For example, for VoIP applications the test methodology is preferably ICMP and the metrics test packet round trip time, loss, interarrival time, number, and delta.

In step 708, the measurement probes or packets are scheduled based on the measurement parameters to be collected. Scheduling requires selection of a number of key parameters governing the measurements, namely assured response time, test packet transmission rate, timeout, and test packet loss count. Assured response time refers to the maximum permissible response time when a Performance problem arises. Test packet transmission rate refers to the number of test packets sent over the communication path being tested as a function of time. Timeout refers to the time interval at the conclusion of which the failure to receive a response (at the source module 140) to a previously transmitted test packet is deemed to represent a packet loss. The time interval begins when the test packet is sent. Finally, test packet loss count refers to the minimum number of consecutive test packet losses for the communication path to be deemed to be unavailable. In VoIP applications in particular, the measurement rate and timeout are selected to ensure that performance and/or connectivity degradation are detected in no more than user-perceivable time scales and the number of successive timeouts is treated as an indication of intermediate path problems.

By way of example, assume that the first enterprise site 100 is in Los Angeles, and the second enterprise site 104 in New York, and the application to be used on a selected communication path is VoIP. For VoIP, the assured response time is preferably no more than about 1.5 seconds, and even more preferably no more than about 1 second. The average roundtrip latency for a packet connection between the first and second sites is 65 milliseconds. The preferred test packet transmission rate is 100 milliseconds, or 10 test packets/second. The timeout will be 200 milliseconds, and the loss is 3 packets. For a loss of connectivity to be identified, the maximum time will be approximately 499 milliseconds, or substantially less than 1 second. This number is based on the fact that it will take no more than approximately 99 milliseconds from the time that connectivity is interrupted for a first test packet to be lost. From the time that the first test packet is lost, two more timeouts are required before a third test packet is sent. Before the third test packet is sent, a total of 299 milliseconds has been used to determine that the first and second test packets have been lost. To send the third test packet and determine that it too has been lost will require an added 200 milliseconds. Thus, a total time of 499 milliseconds will be required for a measurement module 140 to determine that a selected path is not available. This is significantly less than the 1 to 1.5 second maximum detection and response time for Performance problems, leaving a significant amount of time for the routing module to choose a new path and enforce the decision in the edge routers These variables may vary based on the application(s) to be employed and/or the normal latency expected for the path. In the former case, certain applications are more susceptible to variations in specific metrics than others. In the latter case, a possible lookup table useful for VoIP is shown in FIG. 9. The test packet destination has a corresponding country code, National Direct Dialing (NDD) number, and area code. These three values identify uniquely a geographical area. In the example, the combination of country code "1", NDD "1", and area code "201" refers to a geographical area in New Jersey; country code "1", NDD "1", and area code "301" refers to a geographical area in Washington, D.C.; country code "1", NDD "1", and area code "408" refers to a geographical area in California; country code "1", NDD "1", and area code "805" refers to a geographical area in California; country code "44", NDD "0", and area code "20" refers to a geographical area in London, U.K.; and country code "61", NDD "0", and area code "2" refers to a geographical area in central East Australia. Relative to the source measurement module 140, the averaged packet round trip time is provided. For the various identified geographical areas in the U.S., the average round trip time from the geographical area containing the selected measurement module 140 is about 150 milliseconds while that from the geographical area containing the selected measurement module to the identified area in London, U.K., is 300 milliseconds and to the identified area in central East Australia is 350 milliseconds. As can be seen from the next columns, the measurement rate, timeout, and loss count is provided for each combination of geographical areas. As the round trip time increases, the measurement rate, timeout, and loss count generally decrease.

In step 712, a scheduling subcomponent of the module 712 generates and sends probe generation and transmission requests at the scheduled times to a test packet generation and transmission subcomponent of the module. The requests indicate the type of test packets to be sent (or the type of testing methodology to be employed) and the operating mode. A round robin operating mode means that, in each test period, only one link will be used for measuring a target. A simultaneous operating mode means that each link will be measured simultaneously per test period.

In step 716, the generation and transmission subcomponent generates and sends test packets (e.g., Echo requests) at the scheduled intervals over the selected communication path and in response to the requests. This is done by including the source identifier of the source subcomponent and the identifier of the destination subcomponent in the test packet header and placing the test packet on the edge network 112, for example. An edge router 120 on the edge network 112, using the identifier of the source subcomponent, selects a next hop (interface) address of a router in one of the intervening transit networks. The edge router 120 has a plurality of next hop addresses for a given prefix, and a unique next hop address for a pairing of destination prefix and source subcomponent identifier. Each next hop address corresponds to a discrete communication path between the first and second enterprise sites 100 and 104. The next hop addressed router (not shown) then forwards the test packet through the intervening transit network(s) to the destination address. Accordingly, each communication path is generally only fixed at the first hop on either end of the path. The intervening hops can vary among test packets transmitted along the path. In one configuration, the intervening hops do not vary but are fixed, much like a circuit-switched communication path. Such a fixed set of hops can arise when the ReSerVation Protocol (RSVP), MPLS, and/or IPSec protocols are employed. The invention can also be applied to circuit-switched communication path selection. The invention preferably applies to policy-based routing in which the source address of the test packet is used in conjunction with policy rules that specify the different next hop associated with each of the different source addressees. In contrast, destination-based routing determines the next hop for the prefix where the destination address of the test packet classifies into. Under this routing mechanism, all test packets destined to the same destination follow the next hop of the winning route for the destination prefix, regardless of the intended path to measure.

In step 720, the source subcomponent listens for a test packet responsive to the test packet. Continuing with the example of the previous paragraph, the test packet is received by the destination subcomponent of the module 140. The destination subcomponent readdresses the test packet, with the readdressed test packet including the destination subcomponent's identifier as the source and the original source subcomponent's identifier as the destination, and places the responsive test packet (e.g., Echo reply) on the edge network 116. An edge router 120 on the edge network 116, using the identifier of the source subcomponent, selects a next hop (interface) address of a router in one of the intervening networks. As in the edge router 120 in the edge network 112, the edge router has a plurality of next hop addresses for a given prefix, and a unique next hop address for a pairing of destination prefix and source subcomponent identifier.

By using effectively a unique pairing of links at each end of the communication path to define the path, symmetry is maintained between the source and destination subcomponents; that is, test packets and packets responsive thereto are necessarily returned over the same communication path at each end of the path. If the modules 140 and 144 were to be deployed at only one end of the communication path, return path measurements could not be controlled, thereby leading to the inability to react in time to certain network problems (e.g., unidirectional and bidirectional cuts). The tables in each of the edge routers are typically updated using the BGP.

In step 724, the measurement module 140 analyzes the raw test results and provides the results, such as using one or more of the above packet structures to the route selection module 144 and/or data repository. In one configuration, the test results are analyzed by invoking a handler corresponding to the test type of the packet.

In decision diamond 728, the module 140 determines whether there is a next pairing of node sets or communication path to be tested. If so, the module 140 returns to and repeats step 700.

The Data Structures

Generally, raw network data obtained for selected communication paths are aggregated per prefix (destination). The prefixes may be obtained, for example, from edge routers 120 via BGP or created automatically and arbitrarily.

In one configuration, the data structures 148 include a number of variables including the identifiers of each communication path (e.g., source subcomponent IP address, source subcomponent prefix, destination subcomponent IP address, and destination subcomponent prefix), measured performance metrics (e.g., round trip time, packet loss, interarrival time, number of packets, packet delta, packet delay or jitter, timeout, and consecutive packet loss equals or exceeds loss threshold), APR value, and, for each set of performance metrics and APR value, a corresponding timestamp.

The Route Selection Module

Figure 8:
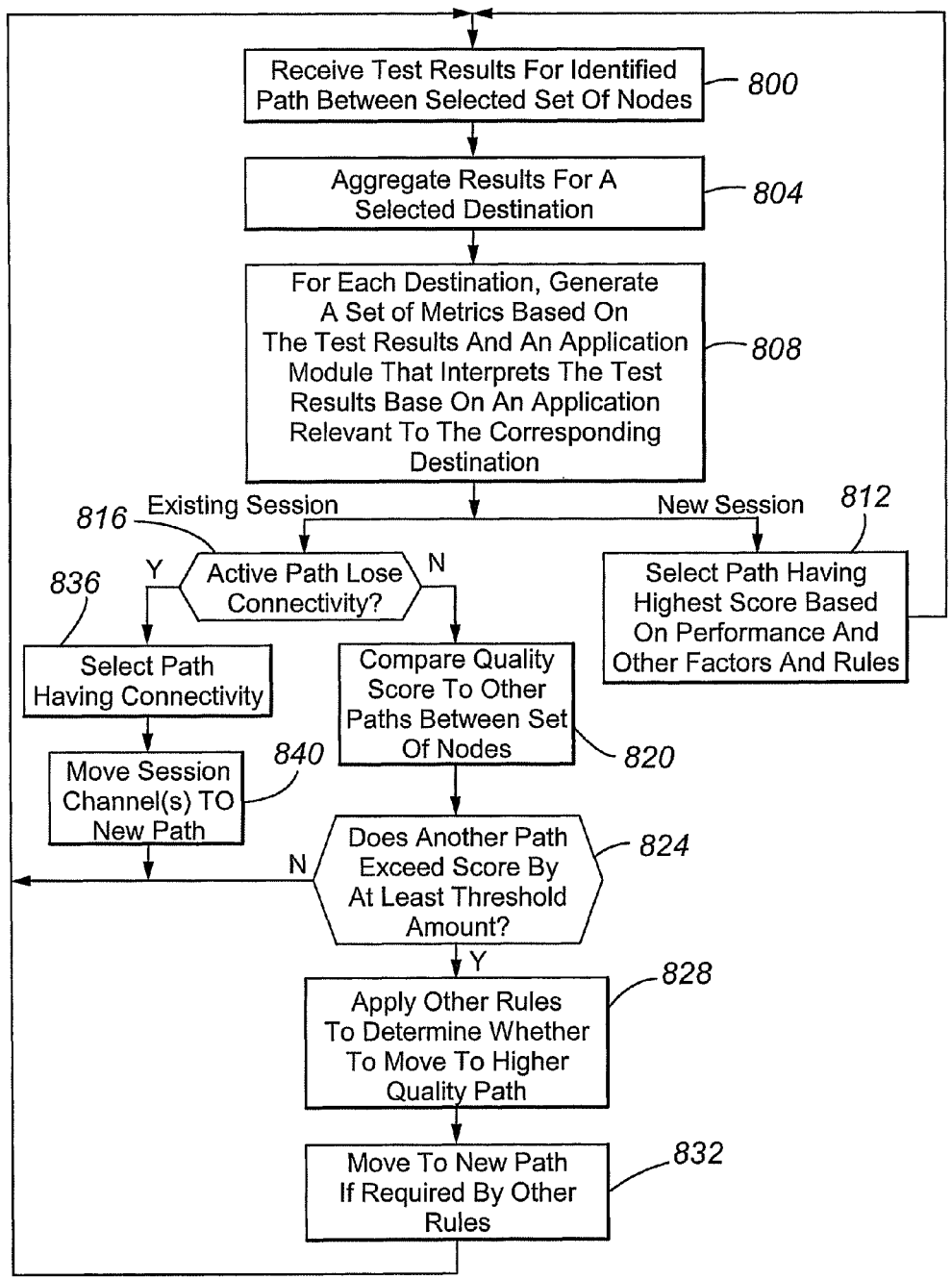
FIG. 8 is a flow chart according to an embodiment of the present invention.

The collective operations of the route selection module 144 and data repository will now be discussed with reference to FIG. 8.

In step 800, test results are received from the measurement module 140 for an identified and selected path between selected first and second sets of nodes.

In step 804, the test results are aggregated for a selected destination prefix.

In step 808, for each destination prefix, a set of metrics is generated based on the test results. In one configuration, the test results are interpreted using an application relevant to the corresponding destination. Route optimization solutions may use different application models to take into account the different reactions different applications or service types can have given the same network conditions or to determine application- or service type-specific APR values. For example, voice communications are very sensitive to jitter and sustained loss but they are less sensitive to random loss, which they can conceal effectively. In contrast, data traffic is more resilient to jitter and cares mainly about delay and loss, which can have a significant impact on throughput. Decision-making uses these metrics to select an alternate path for a given prefix if it determines that there is a path that provides better performance than the current path.

In one configuration, a selected communication path has multiple, different APR values depending on the type of application(s) that may use the path. For example, the APR value for voice traffic more heavily emphasizes jitter and sustained loss than random loss while the APR value for data traffic more heavily emphasizes packet loss of any type than jitter. Stated another way, applications are aggregated into sets having similar communication requirements, and each set of applications is associated with a unique and different algorithm for converting performance metrics into APR values.

The further analysis by the module 144 depends on whether or not there is an existing or new session to be route optimized.

For a new session between a selected set of prefixes, the module 144, in step 812, selects the path having the highest APR score based on performance and/or upon other factors and rules. In the decision process, it is possible that multiple choices exhibit comparable performance, or have comparable APR values, for a selected set of applications. In such cases, the best performing link for the selected set of applications is not necessarily chosen; instead, the module 144 applies other criteria, e.g., random selection across these comparable choices. Examples of such criteria include link load balancing considerations (a link that is less loaded may be more desirable), transit network provider network load balancing considerations (a transit network provider that is less heavily used may be more desirable), billing functions or cost, degree of tolerance to performance degradation for the selected set of applications, path convergence (e.g., of the active path with the higher scored inactive path), the relative magnitude of the APR scores for each communication path relative to a threshold APR score (the threshold score indicating a minimum acceptable Performance for a particular type of session or set of applications), and the like. Such criteria prevent unwanted synchronization among different route optimization modules and helps distribute load among different providers. These policies and rules can be tailored for different prefixes and/or prefix pairings.

For an existing session, the module 144 proceeds to decision diamond 816 where it determines whether or not the active communication path currently used by the data (or payload) packets of the session has lost connectivity. As noted, this occurs when the number of consecutive test packet losses in a selected period of time equals or exceeds a packet loss threshold.

When connectivity is determined to be disrupted on the currently active communication path, the module 144 in step 836 selects a new (potentially previously inactive) path using criteria set forth above in connection with step 812 and, in step 840, moves the session's data-bearing channel(s) to the selected (new) path. The module then returns to step 800.

When connectivity is not determined to be disrupted on the currently active communication path, the module 144, in step 820, accesses the APR or performance scores for each communication path between the source and destination sets of nodes (e.g., between the prefixes for the local networks at the source and destination nodes), selects those scores corresponding to the type of session or application(s) involved, and compares the appropriate scores of the currently active path with those of the other paths.

In decision diamond 824, the module 144 determines whether another path exceeds, typically by a threshold amount, the score of the currently active path. If not, no path change is made, and the module 144 returns to step 800. If so, the module 144 proceeds to step 828 and applies, in the manner noted above, other rules and policies to determine whether or not to move to the path having the higher score.

When the module 144 determines that a move is required, the module 140, in step 832, moves the data packets of the session to the selected (new) path. Movement of the session to another communication path is normally effected by transmitting to edge routers 120 appropriate BGP updates. The module then returns to step 800.

When a path is to be changed, the module 144 communicates such decisions and other communication path updates to the (local) edge routers 120 in the form of BGP updates identifying the communication path to be selected. Edge routers 120 are configured so that these BGP communication path updates are selected and implemented. This allows the module 144 to work autonomously, inserting paths when the module 144 determines that they are necessary. As will be appreciated, adding performance paths or changing paths too frequently can lead to an edge router exceeding its CPU usage and RAM consumption capacity. Therefore, it is preferable to minimize substantially the frequency of BGP updates to the edge routers. Several techniques are available, such as controlling the rate at which the module 144 sends decisions to edge routers, refraining from implementing decisions unless the current communication path's performance degradation exceeds a configured tolerance, or implementing route dampening methods.

Because the servers 124 in the first and second sites are autonomous, a decision to move an outgoing channel of a session to another communication path is normally not communicated to the server 124 at the destination. The converse is also true.

A measurement-based analysis conducted was performed in an internal enterprise network to show the impact of route optimization on the performance of web applications. A further measurement-based analysis was conducted at a customer's enterprise network, showing the impact of route optimization on the performance of Voice over IP (VoIP) traffic.

The internal enterprise network included multi-homed sites in San Jose, Calif.; Boston, Mass.; Newark, N.Y.; and Thornton, Colo. Using passive measurements, the performance of web applications was measured across multiple ISP links from the different POP locations.

Figure 10:
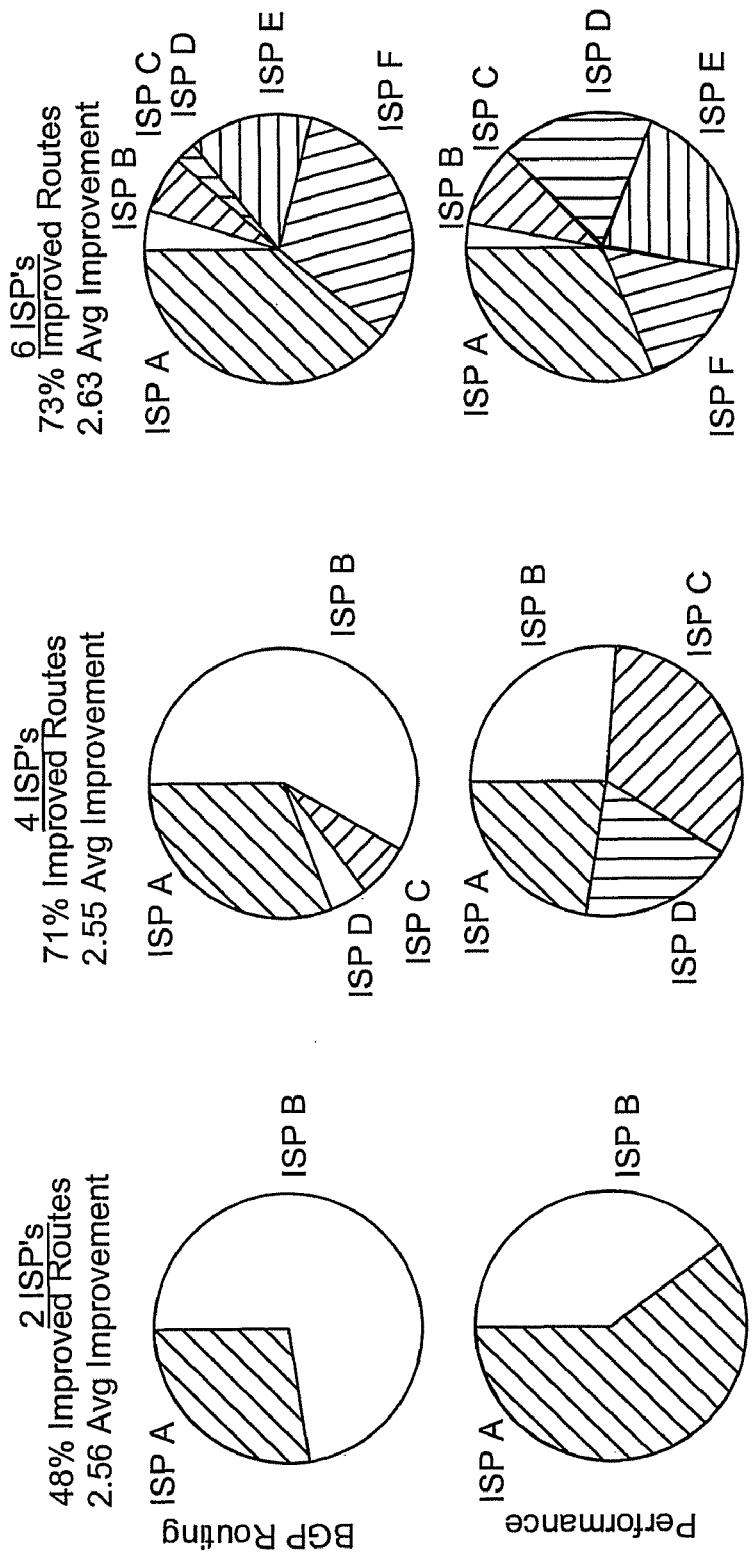
FIG. 10 is a series of pie charts for differing numbers of multi-homed ISPs showing BGP and performance traffic distributions.

Three "what if" scenarios were considered, depending on the degree of multi-homing from each site: 2, 4, or 6 ISPs per site, respectively. For each of these scenarios, both the best performing route and the naturally chosen BGP route towards a given destination were tracked. The experimenters determined the average degree of improvement, across destinations, in the web performance that one may achieve by choosing the best performing path towards that destination (among the 2, 4, or 6 ISPs depending on the scenario), as opposed to the naturally chosen one. The results are summarized in FIG. 10 and show that, depending on the degree of multi-homing, 48% to 73% of the destinations can be improved; for those improved destinations, the average speedup in web page download time is around 2.6.

Comparing the distribution of traffic across the different ISPs obtained from natural routing to that obtained from best exit routing, best exit routing was found to typically result in a more uniform spread of traffic across the ISPs, i.e., no single ISP is best for all traffic. Rather, each ISP is best at routing to a portion of the destinations. Route optimization effectively determines which ISP is the best choice for a given destination and routes traffic accordingly.

This analysis was conducted at a leading financial institution and had the purpose of determining the potential of route optimization in improving application reliability and assessing the potential VoIP reliability of a route-optimized network.

Route optimization devices were installed at an East coast location and a West coast location. They measured two IPsec tunnels (UUNET and AT&T, with T3 access links) and one Frame-Relay link (Qwest DS3 link) connecting the two sites for 11 days. Given that the analysis targets VoIP, which is a real-time, highly demanding application, a fairly high rate of 5 measurements per second was used. Measurements of delay, jitter, sustained loss, and long-term loss were collected for the different paths. The decision-making algorithms were then applied over the various network fabrics, using an application model that takes into account factors that matter for voice performance, i.e., in decreasing degree of relevance, jitter, sustained loss, latency, and long-term loss.

Using these measurements, a number of "bad minutes" was computed for the different connectivity options (Internet alone, Frame Relay alone), as well as for two optimized paths: the Internet optimized path, which only leveraged the two Internet links, and the hybrid optimized path, which leveraged both the Internet and the Frame Relay links. The "bad minutes" parameter represented the cumulative duration of periods in which voice performance would have been deemed unacceptable. Finally, availability figures were computed by comparing the number of bad minutes to the total duration of the test.

In FIG. 11, a typical hour of measurements is shown. The x-axis on all plots represents time. The first plot from the top shows Round Trip Time (RTT) delay across the various choices. Samples drawn at the bottom of the y-axis denote lost samples. A continuous line at the bottom of the y-axis therefore indicates a period of lost connectivity across the link. RTT and loss are represented for all of the two IPsec links, the Frame Relay link, and the Best IPsec link. In the example shown, the best path is UUNET, which typically has the lower RTT. However, as soon as UUNET experiences a loss of connectivity, route optimization detects the problem and routes traffic through the other IPsec tunnel, namely the AT&T link. When the problem is resolved, and after UUNET experiences a few minutes of stability, then the route optimization device routes traffic back through the UUNET link.

FIG. 12 shows the metric used by the route optimization device to rate the performance of VoIP across the different links. The metric summarizes the impact of jitter, sustained loss, latency, and long term loss in one measure. It is MOS-like, i.e., it ranges from 0 to 5 and is based on the E-model standardized R rating. As can be seen in the plot, the MOS rating across UUNET goes down to 1 when the UUNET experiences its loss of connectivity. Finally, FIG. 13 highlights the "bad minutes," i.e., the periods where VoIP performance was unacceptable. While the UUNET route experiences 5 bad minutes, the route-optimized path only experiences degradation for 200 ms, which is the time needed by the route optimization technology to detect the degradation on the default path and route around it.

Figure 14:
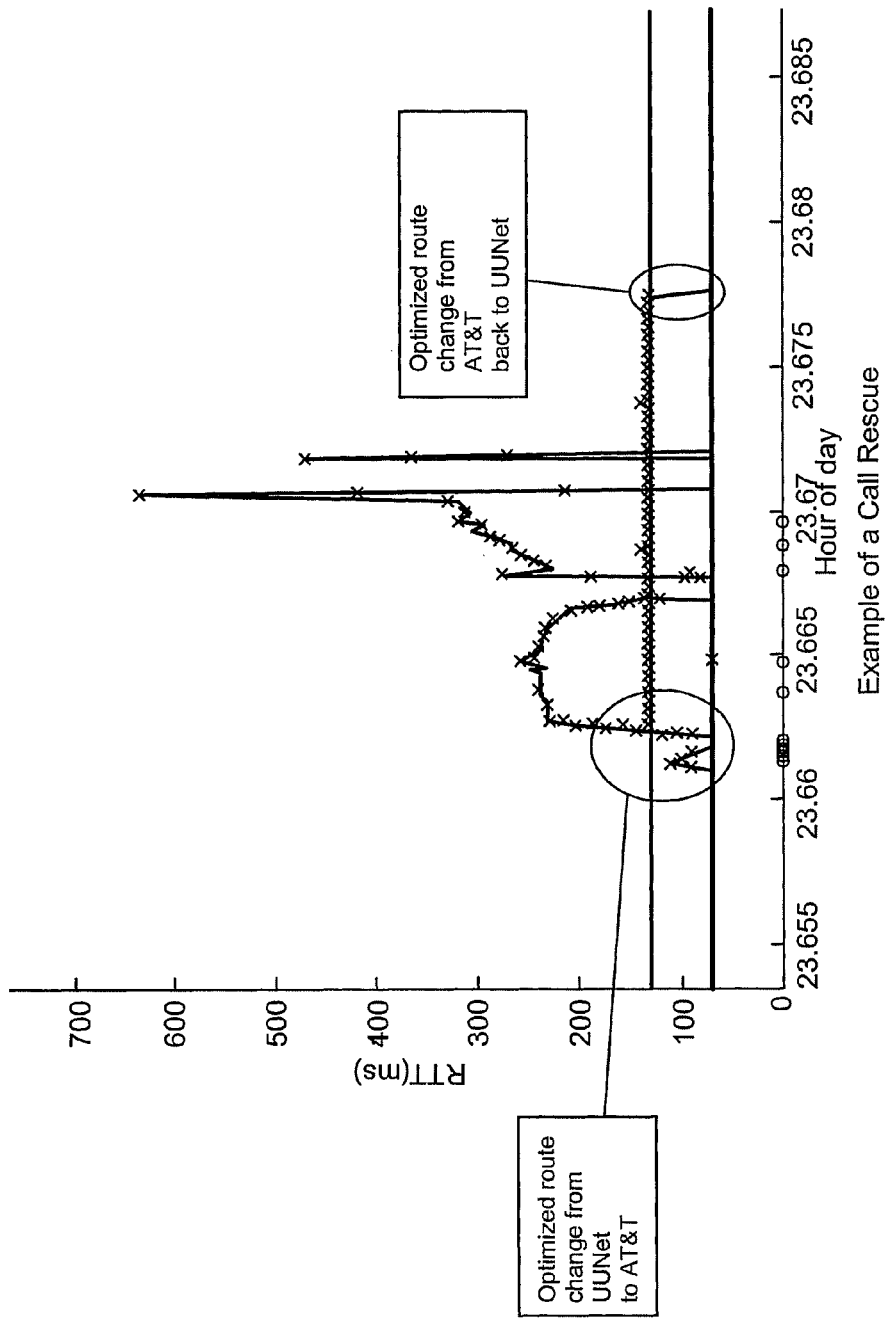
FIG. 14 is a plot of packet RTT (milliseconds) (vertical axis) against time (hour of day) (horizontal axis).

FIG. 14 shows an example call rescue using route optimization. The UUNET path generally exhibits a round-trip time delay of less than 100 ms and is the default choice. However, as shown in this example, jitter is sometimes incurred on that path resulting in delay spikes exceeding 600 ms. As soon as the degradation triggers on the UUNET link, the route optimization device quickly moves the route to the higher latency but more stable AT&T link. Minutes after the UUNET link becomes stable again, the route optimization device moves the route back to the lower latency UUNET link.

In general, it was found that all networks occasionally exhibit quality failures of various kinds. Various types of degradation can occur, including delay spikes, sustained packet loss events, link failures, and delay fluctuations. These performance problems resulted in multi-minute application outages affecting VoIP calls for minutes. Problems, however rarely occur in all networks at once, so route optimization solutions can effectively leverage multiple paths by quickly moving to a stable path when other paths are experiencing such degradations.

Table 1 summarizes the impact of route optimization experienced for the duration of this study. The number of bad minutes experienced in 11 days over the Internet links was around 126. The route-optimized Internet path, on the other hand, only incurred 14.7 bad minutes in 11 days, resulting in a reliability of "three nines," similar to that of the frame relay link, whereas the optimized hybrid WAN incurs as little as 24 bad seconds in 11 days, achieving a "four nines" reliability.

| Network | Bad Minutes | Availability |
|---|---|---|
| Frame Relay | 5.4 | 99.96% |
| Internet | 126.2 | 99.203% |
| Optimized Internet | 14.7 | 99.907% |
| Optimized hybrid WAN | 0.4 | 99.997% |

Table 1 Impact of Route Optimization on VoIP

These results show that, in a web application context, 48% to 73% of the destinations can be improved and that, for those improved destinations, the average speedup is around 2.6. The results show that route optimization technology can add a "9" of reliability to VoIP applications running over the Internet, making it at least comparable to Frame Relay networks in terms of achievable reliability.

The exemplary systems and methods of this invention have been described in relation to electronic signal route selection or optimization. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as an enterprise site, server, and an endpoint (e.g., a mobile phone, PDA, softphone or hardphone, and the like), or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch, such as a PBX and (media) server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the system is used to select components other than or in addition to communication paths in response to connectivity loss or degradation. By way of example, a particular vendor's voice or video codec can be more tolerant of loss than other implementations. The module 144 could use the performance metrics and/or APR scores to select a different codec in response to Performance problems with the monitored communication path. This example can be extended to any number of applications having stringent performance requirements on the underlying network fabric, e.g., enterprise database applications or videoconferencing software.

In another alternative embodiment, routing protocols other than BGP may be employed, such as an Interior Gateway Protocol or IGP.

In yet another embodiment, the enterprise sites are parts of different enterprises.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   a processor selecting at least two parameters, the at least two parameters including a measurement rate and a timeout parameter;
   the processor selecting two or more performance metric thresholds;
   the processor conducting a communication session including at least one data signal and at least one control signal over a first bidirectional communication path;
   the processor monitoring at least the first bidirectional communication path and a second bidirectional communication path, wherein the monitoring comprises sending at least one first test packet over the first bidirectional communication path to a first enterprise site and at least one second test packet over the second bidirectional communication path to the first enterprise site, wherein the first test packet and second test packet are not associated with the communication session;
   receiving the first test packet over the first bidirectional communication path from the first enterprise site, wherein the first enterprise site returns the first test packet to the processor over the first bidirectional communication path;
   receiving the second packet over the second bidirectional communication path from the first enterprise site, wherein the first enterprise site returns the second test packet to the processor over the second bidirectional communication path;
   the processor calculating the value of the at least two parameters upon the return of each of the first test packet on the first bidirectional communication path and the second test packet on the second bidirectional communication path;
   the processor comparing the at least two parameters to the two or more performance metric thresholds for each of the first bidirectional communication path and the second bidirectional communication path;
   the processor, based on the comparison, determining that at least one parameter of the at least two parameters meets or exceeds at least one of the two or more performance metric thresholds in response to the determination, determining that performance over the first bidirectional communication path is degraded; and
   the processor, based on the degraded performance determination, moving, in real-time, at least one of the data signals and the control signals associated with the communication session from the first bidirectional communication path to the second bidirectional communication path.

2. The method of claim 1, wherein the communication session is a live voice communication session and wherein the data signals comprise voice information.

3. The method of claim 1, wherein the first bidirectional communication path and the second bidirectional communication paths are defined by at least one of a source identifier and a destination identifiers, a source address and a destination address, and a source prefix and a destination prefix.

4. The method of claim 1, wherein moving the at least one of the data signals and the control signals is performed by sending an update to a routing device.

5. The method of claim 1, wherein the at least two parameters includes at least one of a test packet loss, a test packet round trip time, a test packet interarrival time, a test packet delta, a test packet jitter, and a hop round trip time.

6. The method of claim 1, further comprising:
   determining, for at least a first performance score based one or more of the at least two parameters measured on the first bidirectional communication path and a second performance score based one or more of the at least two parameters measured on the second bidirectional communication path; and
   when the first performance score on the first bidirectional communication path, based on two or more performance metrics thresholds, is unacceptable, moving at least one of the data signals or the control signals of the session to the second bidirectional communication path.

7. The method of claim 6, further comprising the substeps:
when the comparison of the first performance score to the performance metric thresholds indicates that the first bidirectional communication path has an unacceptable performance and the second bidirectional communication path has acceptable performance, applying the set of rules to determine whether or not to move at least one of one or more data and control signals from the first bidirectional communication to the second bidirectional communication path, the rules considering one or more of the following factors: link load balancing considerations, transit network provider network load balancing considerations, billing functions and cost, degree of tolerance to performance degradation for a selected set of applications, path reliability and path preference.

8. The method of claim 6, further comprising the substeps:
determining a first type of performance score for the first bidirectional communication path and a second type of performance score for the second bidirectional communication paths, the first type of performance score and the second type of performance score being associated with different sets of communication applications; and
selecting, for at least the first bidirectional communication path and second bidirectional communication paths, an appropriate type of performance scores, wherein the first performance score and second performance scores are a type of performance score corresponding to a member of a set of communication applications involved in the communication session.

9. The method of claim 1, wherein the first test packets are directed over at least part of the first bidirectional communication path and the second test packets are directed over the second bidirectional communication paths by one or more policy-based routing techniques.

10. The method of claim 1, wherein the process monitoring step comprises the further substep:
selecting a type of test packet based on at least one of a type of service and a set of applications to use at least first bidirectional communication path and second bidirectional communication paths.

11. The method of claim 1, wherein at least one of the measurement rate, the timeout parameter, and the two or more performance metric thresholds are varied based on at least one of one or more relative geographical locations of nodes at either end of a selected communication path and a normal packet round trip time over the selected communication path.

12. The method of claim 1, wherein the measurement rate is a frequency of transmission of test packets, the timeout parameter is a time period, the passage of which is required to determine that a test packet has been lost, and the two or more parameters are used for a test packet loss threshold which represents a number of consecutive test packets lost over a selected communication path to determine that connectivity over the selected communication path is disconnected.

13. A non-transitory computer readable medium comprising processor-executable instructions for performing the steps of claim 1.

14. The method of claim 1, wherein the processor monitoring step (c) comprises:
generating and providing, at a selected measurement rate, the first set of test packets and the second sets of test packets to a first edge router, the first set of test packets and second set of test packets comprising a source identifier and a target identifier;

determining, by a first edge router using a policy rule and the source identifier, a first next hop address for a first set of test packets and a second next hop address for a second set of test packets;
sending, by the first edge router, the first set of test packets via a first bidirectional communication path identified by the first next hop address and each of the packets in the second test packet set via a second bidirectional communication path identified by the second next hop address;
receiving at least some of the test packets in the first set of test packets and the second sets of test packets, interchanging the positions of the source identifier and destination identifiers in the first set of test packets to create one or more first response packets, interchanging the positions of the source identifier and destination identifier in the second set of test packets to create one or more second response packets, and providing the source identifier and destination identifier to a second edge router associated with the target identifier;
determining, by the second edge router, using a policy rule and the source identifier, a third next hop address for at least one first response packet and a fourth next hop address for at least one second response packet, wherein the first bidirectional communication path comprises the first and third next hop addresses and the second bidirectional communication path the second and fourth next hop addresses; and
sending, by the second edge router, the first response packet via the first bidirectional communication path identified by the third next hop address and the second response packet via the second bidirectional communication path identified by the fourth next hop address.

15. A system, comprising:
at least a first site and a second sites, each of the first site and the second sites comprising:
at least one edge router;
a measurement module simultaneously monitoring a performance of at least a first bidirectional communication path and a second bidirectional communication paths extending between the first site and the second sites and performing at least the following functions
selecting the measurement rate, the timeout parameter, and the performance metric threshold to realize a maximum response time; and
sending test packets over a selected one of the first and second bidirectional communication paths and returning received test packets across the selected one of the first and second bidirectional communication paths over which the test packets were sent, wherein the sending and returning are performed in accordance with the maximum response time; and
a route selection module directing packet traffic from the first bidirectional communication path to the second bidirectional communication path and from the second bidirectional communication path to the first bidirectional communication path in response to a determination that the sending and returning of test packets over of the first bidirectional communication path or second bidirectional communication path, are degraded.

16. The system of claim 15, wherein the test packets are associated with live voice communication.

17. The system of claim 15, wherein at least the first bidirectional communication path and the second bidirectional communication paths are defined by at least the source identifier, the destination identifier, the source address, the destination address, the source prefix and the destination prefix.

18. The system of claim 15, wherein the route selection module directs packet traffic by sending an update to a routing device.

19. The system of claim 15, wherein the test packets are used to measure one or more parameters of the first bidirectional communication path and second bidirectional communication paths which are then compared to the selected performance metric threshold, wherein the one or more parameters includes at least one of a test packet loss, a test packet round trip time, a test packet interarrival time, a test packet delta, a test packet jitter, and a hop round trip time.

20. The system of claim 15, wherein the route selection module further determines, for the first bidirectional communication path and second bidirectional communication paths, a respective performance score on a corresponding set of parameters and when a performance score on the first bidirectional communication path, based on the parameters, is unacceptable, moving at least one data and control signal of the communication session to the second bidirectional communication path.

21. The system of claim 15, wherein the route selection module further compares each of the first performance score and second performance scores for the first bidirectional communication path and second bidirectional communication paths, respectively, against a threshold performance score and when the comparison step indicates that the first bidirectional communication path has an unacceptable performance and the second bidirectional communication path has acceptable performance, applying the set of rules to determine whether or not to move the at least one data and control signals from the first bidirectional communication path to the second bidirectional communication path, the set of rules considering one or more of the following factors: one or more link load balancing considerations, one or more transit network provider network load balancing considerations, one or more billing functions and cost, one or more degree of tolerance to performance degradation for the selected set of applications, a path reliability, and a path convergence.

22. The system of claim 15, wherein the route selection module determines the first type of performance score for the first bidirectional communication path and the second type of performance score for the second bidirectional communication paths, wherein the first types of performance scores is associated with a different sets of communication applications than the second type of performance score, and both the first performance score and second performance score are selected to support the set of communication applications being utilized by the communication session.

23. The system of claim 15, wherein the test packets are directed over at least part of the first bidirectional communication path and second bidirectional communication paths by policy-based routing techniques.

24. The system of claim 15, wherein the measurement module selects a type of test packet based on at least one of the type of service and the set of applications to match at least the first bidirectional communication path and the second bidirectional communication path.

25. The system of claim 15, wherein the measurement module varies at least one of the measurement rate, the timeout parameter, and the performance metric threshold based on at least one of the relative geographical locations of nodes at either end of the selected communication path and the normal packet round trip time over the selected communication path.

26. The system of claim 15, wherein the measurement rate is a frequency of transmission of test packets, the timeout parameter is a time period, the passage of which is required to determine that a test packet has been lost, and the performance metric threshold is a test packet loss threshold which represents a number of consecutive test packets lost over a selected communication path to determine that connectivity over the selected communication path is disconnected.

* * * * *

UNITED STATES PATENT AND TRADEMARK OFFICE
CERTIFICATE OF CORRECTION

| | | |
|---|---|---|
| PATENT NO. | : 8,289,845 B1 | Page 1 of 2 |
| APPLICATION NO. | : 11/862666 | |
| DATED | : October 16, 2012 | |
| INVENTOR(S) | : Omar Baldonado et al. | |

It is certified that error appears in the above-identified patent and that said Letters Patent is hereby corrected as shown below:

In the Claims:

Column 20, line 49, delete "paths" and insert --path--.

Column 20, line 50, delete "identifiers" and insert --identifier--.

Column 20, line 56, delete "includes" and insert --include--.

Column 20, line 60, delete "determining, for at least" and insert --determining at least--.

Column 21, line 1, delete "metrics" and insert --metric--.

Column 21, line 23, delete "paths" and insert --path--.

Column 21, line 27, delete "paths" and insert --path--.

Column 21, line 27, delete "scores" and insert --score--.

Column 21, line 36, delete "paths" and insert --path--.

Column 21, line 43, delete "paths" and insert --path--.

Column 21, line 47, delete "locations" and insert --location--.

Column 21, line 47, delete "(c)".

Column 21, line 64, delete "sets" and insert --set--.

Column 22, line 12, delete "sets" and insert --set--.

Column 22, line 14, delete "identifiers" and insert --identifier--.

Column 22, line 21, delete "using a policy" and insert --using the policy--.

Column 22, line 35, delete "sites" and insert --site--.

Column 22, line 36, delete "sites" and insert --site--.

Column 22, line 41, delete "paths" and insert --path--.

Column 22, line 42, delete "sites" and insert --site--.

Column 22, line 60, delete "of".

Column 22, line 67, delete "paths" and insert --path--.

Signed and Sealed this
Fourteenth Day of May, 2013

Teresa Stanek Rea
*Acting Director of the United States Patent and Trademark Office*

CERTIFICATE OF CORRECTION (continued)
U.S. Pat. No. 8,289,845 B1

In the Claims:

Column 23, line 9, delete "paths" and insert --path--.

Column 23, line 11, delete "includes" and insert --include--.

Column 23, line 16, delete "paths" and insert --path--.

Column 23, line 25, delete "scores" and insert --score--.

Column 24, line 7, delete "paths" and insert --path--.

Column 24, line 7, delete "types" and insert --type--.

Column 24, line 7, delete "scores" and insert --score--.

Column 24, line 8, delete "sets" and insert --set--.

Column 24, line 15, delete "paths" and insert --path--.